(12) United States Patent
Thiers et al.

(10) Patent No.: US 7,419,284 B2
(45) Date of Patent: Sep. 2, 2008

(54) PASSING LAMP ASSEMBLY FOR MOTORCYCLE

(75) Inventors: Jean-Michel Thiers, Cypress, CA (US); Mark Blankers, Cypress, CA (US)

(73) Assignee: Yamaha Motor Corporation, USA, Cypress, CA (US)

( * ) Notice: Subject to any disclaimer, the term of this patent is extended or adjusted under 35 U.S.C. 154(b) by 113 days.

(21) Appl. No.: 11/451,977

(22) Filed: Jun. 12, 2006

(65) Prior Publication Data

US 2007/0285935 A1  Dec. 13, 2007

(51) Int. Cl.
*F21V 33/00* (2006.01)
*F21V 21/14* (2006.01)
*F21S 8/00* (2006.01)

(52) U.S. Cl. .................. 362/473; 362/421; 362/528; 362/549

(58) Field of Classification Search ............ 362/40, 362/41, 46, 418, 421, 427, 473–476, 506, 362/507, 523, 528–532, 549, 250, 269, 285, 362/319, 430; 116/35 R, 46, 51, 52
See application file for complete search history.

(56) References Cited

U.S. PATENT DOCUMENTS

| | | | | |
|---|---|---|---|---|
| 1,612,960 A | * | 1/1927 | Anderson | 362/504 |
| 1,783,516 A | * | 12/1930 | Moreton | 362/258 |
| 2,185,012 A | * | 12/1939 | Blazier | 362/421 |
| 2,438,196 A | * | 3/1948 | Washington | 362/293 |
| 5,184,884 A | * | 2/1993 | Maglica et al. | 362/191 |
| 6,764,206 B1 | * | 7/2004 | Felty | 362/476 |
| 7,264,076 B2 | * | 9/2007 | Grigg et al. | 180/219 |

\* cited by examiner

*Primary Examiner*—Hargobind S. Sawhney
*Assistant Examiner*—David R Crowe
(74) *Attorney, Agent, or Firm*—Hogan & Hartson LLP

(57) ABSTRACT

A passing lamp assembly for a motorcycle. A mount arm extends between opposite end portions and is mounted below the headlight of a motorcycle. A spherical element having a through-hole passing therethrough is formed at the mount arm end portions. Passing lamps are pivotally mounted above the spherical elements by stems attached to the lamps and passing through the spherical elements. Spherical washers are mounted around the stem between the passing lamp and the spherical element, and between the underside of the spherical element and a fastener. First and second turn signals are mounted below the spherical elements by turn signal mounts and are not pivotally movable relative to the mount arm. The turn signal mounts conceal mounting hardware for the passing lamp.

16 Claims, 4 Drawing Sheets

PASSING LAMP ASSEMBLY FOR MOTORCYCLE

BACKGROUND OF THE INVENTION

1. Field of the Invention

The present invention relates generally to motorcycles and, more particularly, relates to an assembly for mounting passing lamps to a motorcycle.

2. Description of Related Art

Saddle-type vehicles such as motorcycles are typically provided with a headlight to provide illumination at night and under low-lighting conditions. Turn signal lights to signal left and right turns are also typically provided. Other types of lighting, such as passing lamps, may also be added as accessories in order to provide greater or different (i.e. fog conditions) amounts of illumination, as well as to enhance the appearance of the motorcycle.

Mounting multiple and various sources of illumination to a motorcycle is problematic due to the limited mounting area and surfaces available on a motorcycle. Bracket-type mounting assemblies have been provided to which both turn signals and passing lamps may be mounted. Known assemblies, however, suffer from various drawbacks. Usually, the mounted lamps or lights are fixed relative to the mount and cannot be adjusted. Where adjustable, the means for adjusting the lamps have been difficult to access and have not provided a great range of adjustment. Moreover, the mounting hardware and wiring associated with the extra lamps/lights is typically not well-concealed.

SUMMARY OF THE INVENTION

The present invention provides a passing lamp mounting assembly for a motorcycle that overcomes the drawbacks and disadvantages of prior art assemblies.

One embodiment of the invention is a lighting mount assembly for a vehicle. A first lamp is mounted to a mount arm and is pivotally movable relative to the mount arm. A second lamp is mounted to the mount arm and is not pivotally movable relative to the mount arm.

Another embodiment of the invention is a passing lamp mount assembly for a motorcycle. The assembly comprises a mount arm having a spherical element integrally formed therein. A through-hole passes through the spherical element, and the spherical element has upper and lower spherical surfaces configured as one true sphere. A passing lamp is mounted to the mount arm over the spherical element and is pivotally movable about the spherical element relative to the mount arm.

Another embodiment of the invention is a passing lamp assembly. The passing lamp assembly comprises a mount arm extending between opposite end portions. A spherical element having a through-hole passing therethrough is formed at each opposite end portion. First and second passing lamps are pivotally mounted above the spherical elements via stems attached to the lamps and passing through the spherical elements. First and second turn signals are mounted below the spherical elements by turn signal mounts. The first and second turn signals are not pivotally movable relative to the mounting arm.

Other features and advantages of the invention will be apparent from the following detailed description, taken in conjunction with the accompanying drawings which illustrate, by way of example, various features of embodiments of the present invention.

DETAILED DESCRIPTION OF THE INVENTION

Reference will now be made to the drawings wherein like numerals refer to like parts throughout. While the following description is made primarily with reference to a motorcycle, it should be understood that the passing lamp assembly of the present invention could as well be deployed on other saddle-type vehicles.

Figure 1:
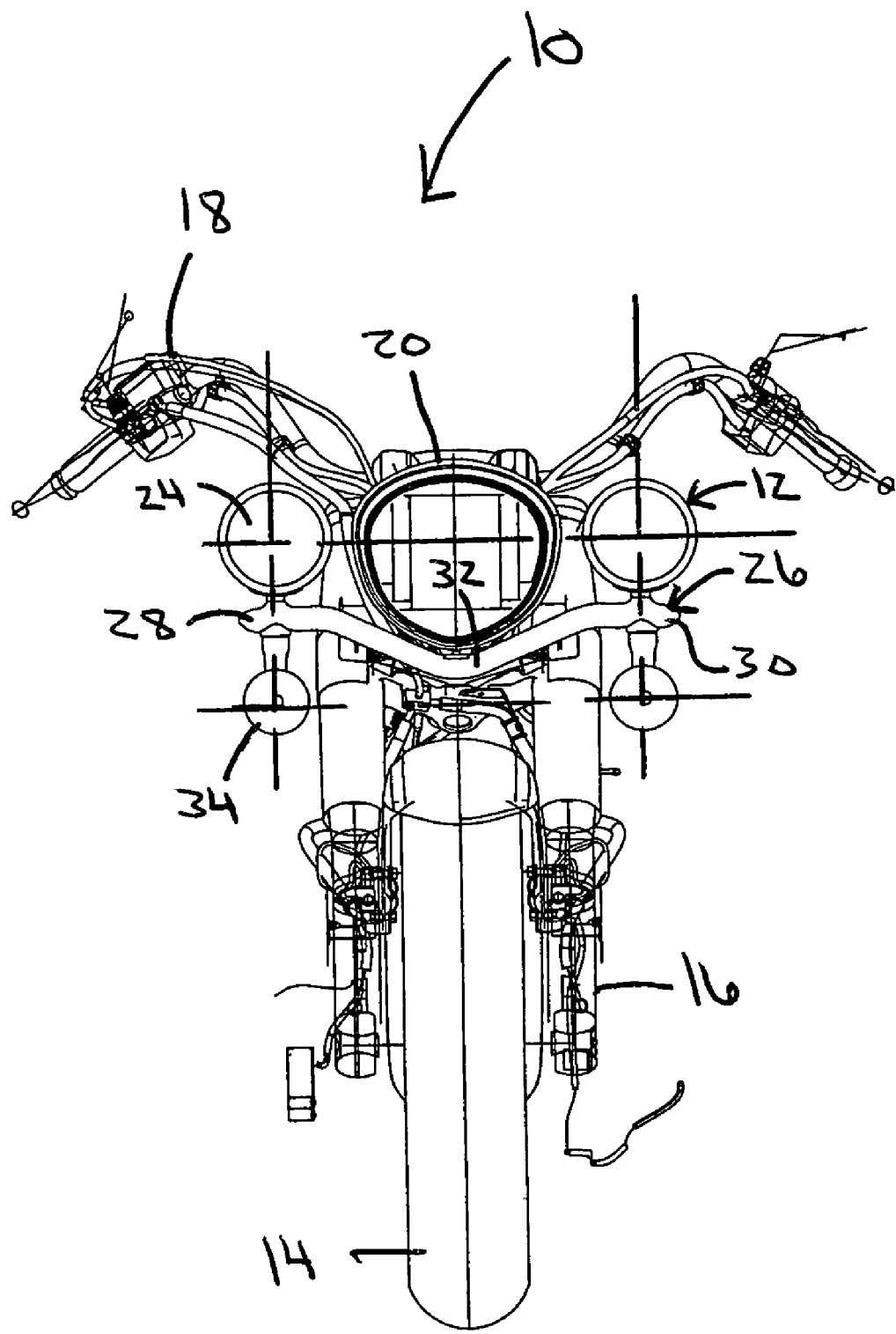
FIG. 1 is a front view of a motorcycle with a passing lamp assembly according to the present invention.

FIG. 1 is a front view of a motorcycle 10 having a passing lamp assembly 12 mounted thereon. Motorcycle 10, with the exception of passing lamp assembly 12, is constructed and configured in a conventional manner. For example, motorcycle 10 includes a front wheel 14 rotatably mounted on front fork 16. Front fork 16 is rotatably mounted on the front end of a main body frame, and a steering handle 18 is mounted on the upper portion of front fork 16 so that a rider may steer motorcycle 10 by rotating front fork 16 and its attached wheel 14. A headlight 20 is also mounted on the upper portion of front fork 16. As is known, motorcycle 10 also includes other conventional components that are not shown, such as a rear wheel and saddle seat, as well as an engine and transmission mounted within the body frame for driving the wheels.

Passing lamp assembly 12 includes a pair of passing lamps 24 pivotally mounted to a passing lamp mount arm 26. As shown, mount arm 26 may be one integral member. Alternatively, mount arm 26 could comprise several components coupled together. For instance, mount arm 26 could comprise separate right and left arm members coupled together by a central member. Passing lamps 24 are mounted at opposite ends of mount arm 26. That is, as viewed from the front in FIG. 1, one passing lamp 24 is mounted at the left end 28 of mount arm 26 and the other passing lamp 24 is mounted at the right end 30 of mount arm 26

As shown in FIG. 1, passing lamp mount arm 26 is mounted to motorcycle 10 below headlight 20 and above wheel 14. In one embodiment, mount arm 26 is mounted in a manner such that its central portion 32 is vertically aligned with headlight 20 and wheel 14. Central portion 32, when mounted, is below headlight 20 and is at the lowest height (relative to the bottom of wheel 14) of mount arm 26. From each side of central portion 32, mount arm 26 slants upwardly at a slight angle towards the relatively higher right and left ends 28 and 30, such that mount arm 26 has a flattened "V" shape. Passing lamps 24 are mounted above the relatively higher right and left ends 28 and 30. Passing lamps 24 straddle and are at approximately the same vertical height as headlight 20.

Figure 2:
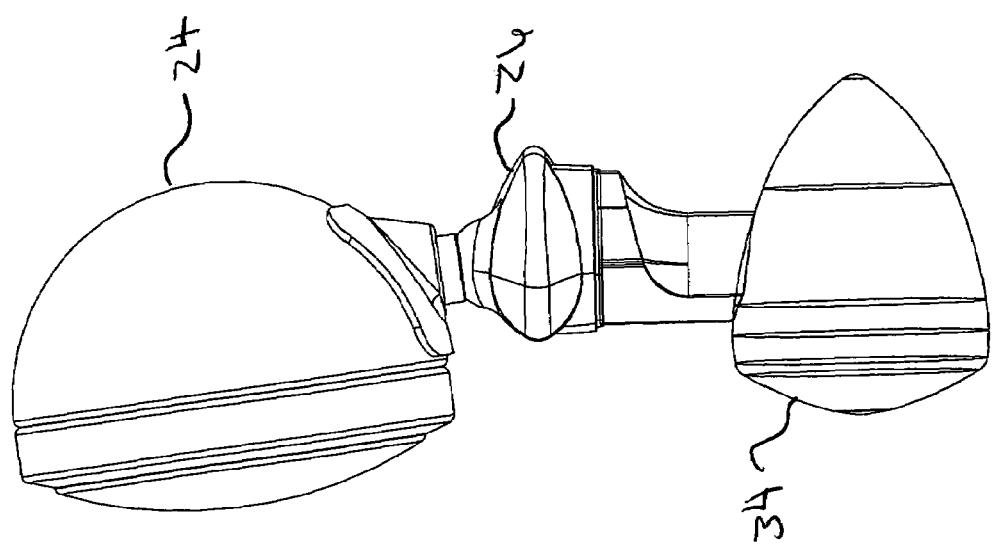
FIG. 2 is a side view of a passing lamp assembly according to the present invention.

Turn signal lights 34 are mounted to the undersides of left and right ends 28 and 30 of mount arm 26 in vertical alignment with passing lamps 24. Turn signal lights 34 are fixed to, and do not pivot or rotate relative to, mount arm 26. As shown in FIG. 2, this is in contrast to passing lamps 24, which are pivotally mounted to mount arm 26 and can pivot and rotate relative to mount arm 26. This is due to the fact that passing lamps 24 are structurally separate components from turn signals 34. As will be described in detail below, in known prior art configurations, the passing lamps are connected to or share a common shaft or stem with their opposing turn signal. Therefore, any pivot or rotation of the passing lamp causes an equal and opposite pivot or rotation of its connected turn signal. Pivoting of the turn signals with the passing lamps is generally not desirable, and is eliminated by the present invention.

Figure 4:
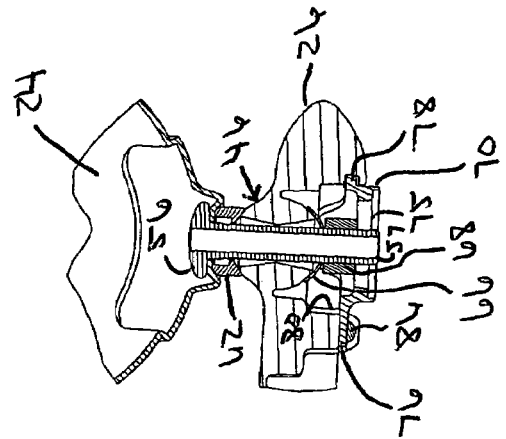
FIG. 4 is a partial sectional view of a passing lamp assembly according to the present invention.
Figure 3:
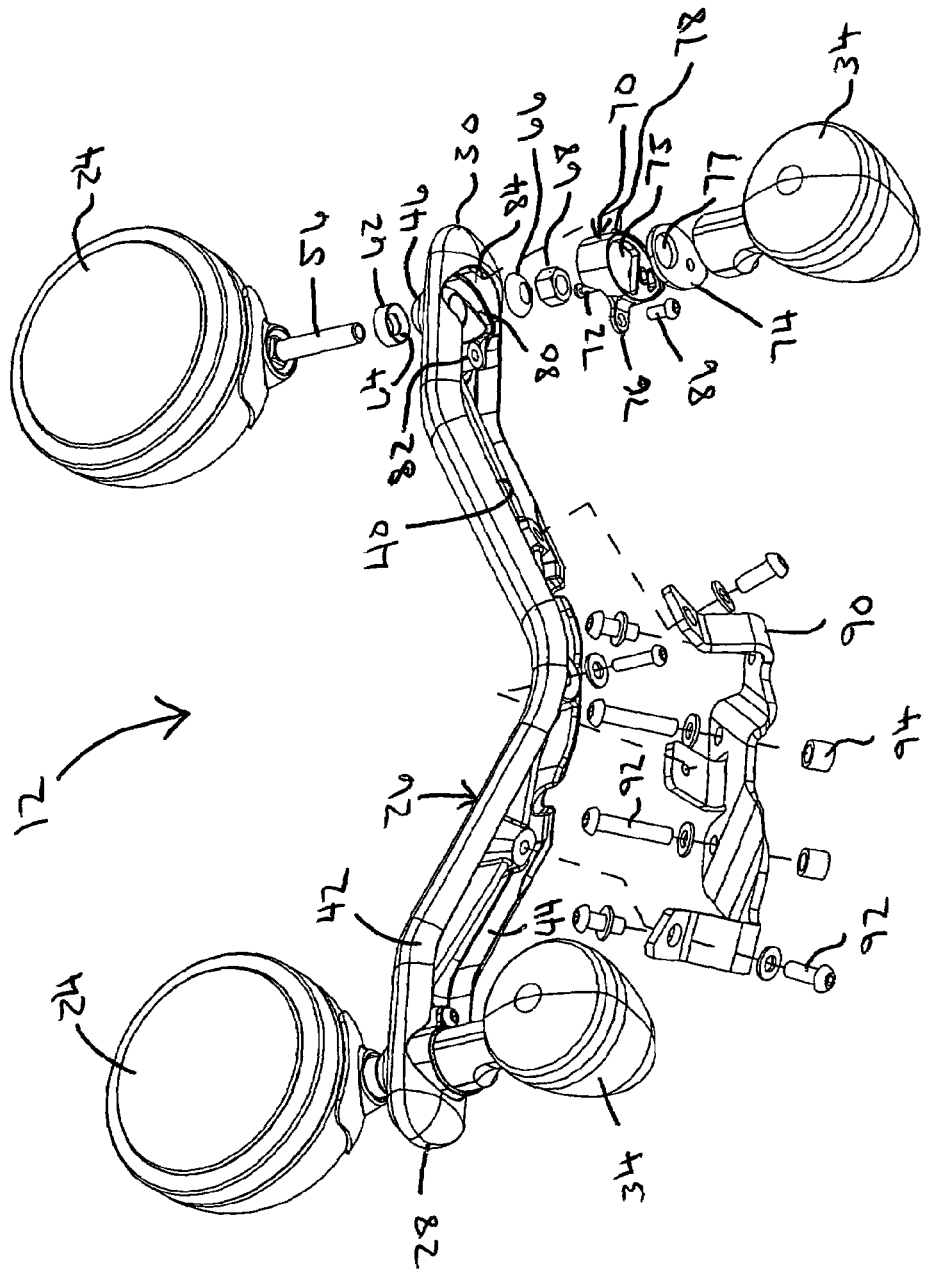
FIG. 3 is a perspective view showing the components of a passing lamp assembly according to the present invention.

FIGS. 3 and 4 illustrate in detail the construction of passing lamp assembly 12. Mount arm 26 has a lengthwise recess 40 formed on its underside and defined by front and rear overhanging portions 42 and 44. Recess 40 provides an advantageous enclosure for concealing electrical wiring (not shown) that must pass through assembly 12 to the electrical lighting elements within passing lamps 24 and turn signals 34.

Figure 5A:
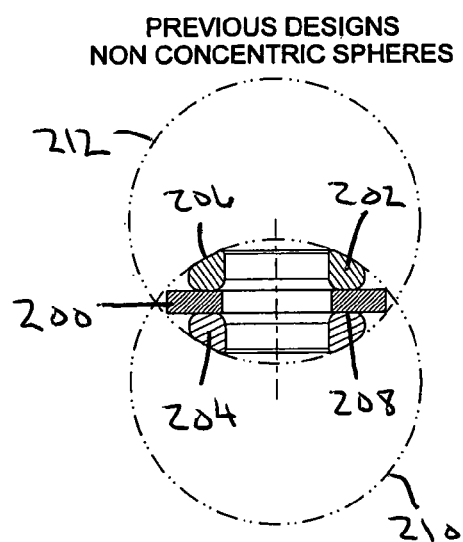
FIG. 5A is a partial sectional view of a conventional passing lamp assembly.
Figure 5B:
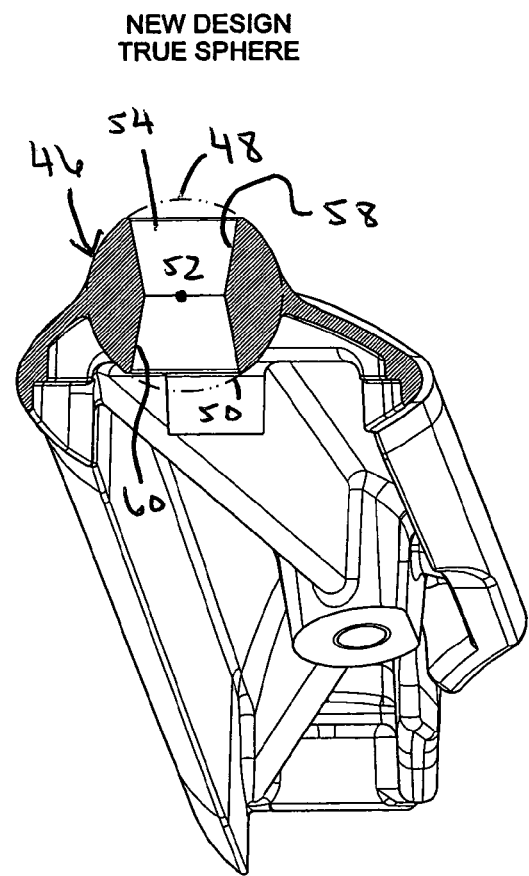
FIG. 5B is a partial sectional view of a passing lamp assembly according to the present invention.

As best seen in FIGS. 4 and 5B, a spherical element 46 is formed within the right and left ends 28 and 30 of mount arm 26. The upper portion of spherical element 46 projects above the top surface of mount arm 26 and is proximate passing lamp 24. The lower portion of spherical element 46 projects into recess 40 and is proximate turn signal 34. As will be described, the spherical, exterior surfaces of spherical element 46 facilitate pivotal movement of passing lamps 24 relative to mount arm 26.

In a preferred embodiment, spherical element 46 is a "true sphere". That is, as shown in FIG. 5B, the circular arc 48 that traces the upper half of element 46 is concentric with the circular arc 50 that traces the lower half of element 46. Or, in other words, all points along both the upper and lower exterior surfaces of spherical element 46 are equidistant from a center point 52. In this manner, spherical element 46 is defined as a "true sphere".

A through-hole 54 passes through spherical element 46. When assembled, as shown in FIG. 4, through-hole 54 receives stem 56 that extends from passing lamp 24. In order to facilitate pivotal movement of stem 56 within through-hole 54, both the upper and lower portions of through-hole 54 flare outwardly from the center point 52 of spherical element 46. Thus, upward and outwardly-angled surfaces 58 are defined in the upper portion of through-hole 54, and downward and outwardly-angled surfaces 60 are formed in the lower portion of through-hole 54.

As noted above, stem 56 extends from the lower portion of passing lamp 24. In one embodiment, stem 56 is hollow to define a passageway for wiring connected to the electrical components contained within passing lamp 24. However, if wiring is not necessary (for example, if lamp 24 is battery-operated), stem 56 need not be hollow. The exterior of stem 56 is preferably threaded to permit attachment of a nut (described below).

A spherical washer 62 is mounted on stem 56 and interposed between the undersurface of passing lamp 24 and the upper exterior surface of spherical element 46. The curvature of the spherical undersurface 64 of washer 62 matches that of the exterior surface of spherical element 46. Thus, washer 62 is able to move about the exterior surface of spherical element 46, facilitating pivotal movement of lamp 24. As described above, during such movement, the outwardly-flared interior surfaces of through-hole 54 facilitate the corresponding pivotal movement of stem 56. A spherical washer 66 is secured between the lower portion of spherical element 46 and a nut 68 which is threaded around the lower end of stem 56. Thus, washer 66 is also able to pivot about the outer surface of spherical element 46 during pivotal movement of passing lamp 24.

The orientation of passing lamps 24 is easily adjustable via the loosening or tightening of nut 68. Nut 68 is loosened, lamp 24 is pivotally adjusted to its desired orientation, and nut 68 is then tightened in order to secure lamp 24 in that orientation.

The configuration of spherical element 46 as a true sphere and integral with mounting arm 26 is a significant improvement over known prior art configurations. As shown in FIG. 5A, prior art configurations utilize a flat arm element 200 to which are mounted upper and lower washers 202 and 204 having curved outer surfaces 206 about which a passing lamp can pivot. Flat inner surfaces 208 of the washers mate against the flat arm element 200. The stem of a passing lamp (not shown) extends through the centers of washers 202 and 204 and the assembly is secured by a nut. As can be seen, the circular arc 210 that traces the outer curvature of the upper washer 202 is not concentric with the circular arc 212 that traces the outer curvature of the lower washer 204. Consequently, and as can be readily seen by a comparison of FIG. 5A with applicant's inventive FIG. 5B, a passing lamp mounted in the assembly of FIG. 5A will have a much smaller degree of movement than a passing lamp mounted in the assembly of applicant's FIG. 5B.

Turn signal 34 is mounted to the underside of mounting arm 26 via turn signal mount 70. Turn signal mount 70 is attached to turn signal 34 by turn signal fastener 72. A rubber damper 74 may be interposed between turn signal mount 70 and turn signal 34. Through holes 75 and 77 are formed, respectively, through mount 70 and damper 74 to facilitate passage of electrical wiring into turn signal 34. Turn signal mount 70 is wing-shaped, and nests within a corresponding wing-shaped recess 80 formed underneath mounting arm 26 and surrounding the lower portion of spherical element 46. Also, as shown in FIG. 4, the end 57 of stem 56 extends partially into hole 75 in turn signal mount 70 when passing lamp 24 is secured to mount arm 26 via nut 68.

Two tabs 76 and 78 project from opposite sides of turn signal mount 70 and facilitate attachment of turn signal 34 to mount arm 26. Tab 76, on the left side of mount 70 (FIG. 3), has a hole formed therethrough. When turn signal mount 70 is nested within corresponding wing-shaped recess 80 underneath mounting arm 26, the hole formed through tab 76 is in alignment with a mounting hole 82 in mounting arm 26. Tab 78, conversely, is simply a flat, solid tab or key that fits within a corresponding slot or keyway 84 formed in a sidewall on the underside of mounting arm 26. Thus, to attach turn signal mount 70 (and turn signal 34 coupled thereto) to mounting arm 26, in the course of nesting mount 70 within wing-shaped recess 80, tab 78 is inserted into corresponding slot 84, and tab 76 is aligned over mounting hole 82. A fastener 86 is passed through tab 76 and into mounting hole 82 to secure turn signal 34 to mounting arm 26. Fastener 86 and mounting hole 82 may be threaded for this purpose.

Thus, the assembly of passing lamp 24 to mounting arm 26 is completely separate from the assembly of turn signal 34 to mounting arm 26. In prior art configurations, by contrast, the turn signal and passing lamp are mounted to a common shaft, leading to the negative consequence that pivotal adjustment of the passing lamp effects an equal and opposite pivotal adjustment of the turn signal. Moreover, in applicant's configuration, access to nut 68 for purposes of adjusting the mounting angle of passing lamp 24 is achieved by the removal of one fastener. Fastener 86 is removed to detach mount 70 and turn signal 34 from mounting arm 26, providing access to fastening nut 68.

The configuration of turn signal mount 70 provides another, aesthetic advantage in that the mounting hardware such as nut 68 is concealed from view. In prior art configurations, by contrast, the passing lamp and turn signals are mounted on a common shaft, leaving the mounting hardware exposed to view, which is not as cosmetically pleasing.

Passing lamp assembly 12 is mounted to motorcycle 10 via a mounting bracket 90 and various fasteners 92, spacers 94, etc. Mounting bracket 90 may be custom-configured to mount passing lamp assembly to a particular vehicle, and is also preferably configured to be as concealed from view as possible.

The particular embodiments of the invention described in this document should be considered illustrative, rather than restrictive. Modification to the described embodiments may be made without departing from the spirit of the invention as defined by the following claims.

The invention claimed is:

1. A lighting mount assembly for a vehicle comprising:
    a mount arm;
    a first lamp mounted to the mount arm and being pivotally movable relative to the mount arm, wherein a spherical element with a central through-hole is formed in the mount arm, defining an exterior spherical surface about which the first lamp pivots;
    a stem extending from the first lamp and through the through-hole of the spherical element;
    a first spherical washer mounted around the stem above the mount arm between the first lamp and an upper portion of the spherical element;
    a second spherical washer mounted around the stem below the mount arm between a lower portion of the spherical element and a fastener that secures the first lamp and first and second washers to the mount arm; and
    a second lamp mounted to the mount arm and not being pivotally moveable relative to the mount arm.

2. A lighting mount assembly as claimed in claim 1, wherein the first lamp is a passing lamp that is mounted above the mount arm and the second lamp is a turn signal that is mounted underneath the mount arm.

3. A lighting mount assembly as claimed in claim 2, wherein two passing lamps are mounted at opposite ends of the mount arm, and two turn signals are mounted at opposite ends of the mount arm underneath the passing lamps.

4. A lighting mount assembly as claimed in claim 1, and further comprising:
    a mount for mounting the second lamp to the mount arm, wherein the mount conceals the fastener and second washer.

5. A lighting mount assembly as claimed in claim 4, wherein the mount for the second lamp comprises:
    a first tab with a through-hole and a second tab without a through-hole;
    a second fastener passing through the first tab and into a corresponding mounting hole formed in the mount arm; and
    wherein a slot is formed in the mount arm to receive the second tab.

6. A motorcycle comprising a lighting mount assembly as claimed in claim 1.

7. A passing lamp mount assembly for a motorcycle, comprising:
    a mount arm having a spherical element integrally formed therein with a through-hole passing through the spherical element, the spherical element having upper and lower spherical surfaces configured as one true sphere;
    a turn signal mounted to the mount arm underneath the spherical element and not being pivotal relative to the mount arm;
    a turn signal mount for mounting the turn signal to the mount arm, wherein the turn signal mount conceals a fastener that secures the passing lamp to the mount arm; and
    a passing lamp mounted to the mount arm over the spherical element and being pivotally movable about the spherical element relative to the mount arm.

8. A passing lamp mount assembly as claimed in claim 7, and further comprising:
    a stem extending from the passing lamp and through the through-hole of the spherical element;
    a first spherical washer mounted around the stem above the mount arm between the passing lamp and the upper spherical surface of the spherical element; and
    a second spherical washer mounted around the stem below the mount arm between the lower spherical surface of the spherical element, wherein the fastener secures the passing lamp and first and second washers to the mount arm.

9. A passing lamp assembly as claimed in claim 8, wherein the through hole defines inner surfaces that flare outwardly from a central portion of the through hole in order to facilitate pivotal movement of the stem.

10. A passing lamp assembly as claimed in claim 7, wherein the mount arm defines a recess on an underside thereof to conceal electrical wiring.

11. A passing lamp assembly as claimed in claim 7 wherein the turn signal mount comprises a tab that fits into a corresponding slot formed in the mount arm.

12. A passing lamp assembly as claimed in claim 11, and further comprising a second fastener for mounting the turn signal mount to the mount arm.

13. A motorcycle comprising a passing lamp assembly as claimed in claim 7.

14. A passing lamp assembly comprising:
    a mount arm extending between opposite end portions, wherein a spherical element having a through-hole passing therethrough is formed at each opposite end portion of the mount arm;
    first and second passing lamps mounted above the spherical elements, wherein the first and second passing lamps are pivotally mounted to the spherical elements via stems attached to the lamps and passing through the spherical elements; and
    first and second turn signals mounted below the spherical elements by turn signal mounts, wherein the first and second turn signals are not pivotally mounted to the mounting arm.

15. A passing lamp assembly as claimed in claim 14, wherein the spherical element is a true sphere, and wherein spherical washers are mounted between the passing lamps and the spherical element.

16. A passing lamp assembly as claimed in claim 15, wherein the turn signal mounts conceal mounting hardware that attaches the passing lamps to the mount arm.

\* \* \* \* \*